United States Patent [19]
Mangina

[11] Patent Number: 5,694,835
[45] Date of Patent: Dec. 9, 1997

[54] HUMIDITY MEASUREMENT ARRANGEMENT AND COOKING OVEN PROVIDED THEREWITH

[75] Inventor: Franco Tassan Mangina, Marsure, Italy

[73] Assignee: Zanussi Grandi Impianti S.p.A., Pordenone, Italy

[21] Appl. No.: 521,390

[22] Filed: Aug. 10, 1995

[30] Foreign Application Priority Data

Sep. 9, 1994 [IT] Italy .................. PN940051 U

[51] Int. Cl.⁶ ......................................... A21B 1/08
[52] U.S. Cl. ................. 99/468; 99/330; 99/331; 99/476; 126/21 A; 126/369
[58] Field of Search ................ 99/331, 330, 332, 99/333, 325, 345, 346, 347, 451, 467, 468, 473, 476; 126/21 A, 369; 219/400, 401

[56] References Cited

U.S. PATENT DOCUMENTS

| | | | |
|---|---|---|---|
| 4,173,215 | 11/1979 | Bureau et al. | 99/476 X |
| 4,722,321 | 2/1988 | Meister | 126/369 X |
| 4,823,766 | 4/1989 | Violi | 99/476 X |
| 4,939,987 | 7/1990 | Smith | 126/369 X |
| 5,120,214 | 6/1992 | West et al. | 431/12 |
| 5,272,963 | 12/1993 | Del Fabbro | 99/330 X |

*Primary Examiner*—Reginald L. Alexander
*Attorney, Agent, or Firm*—Pearne, Gordon, McCoy & Granger LLP

[57] ABSTRACT

A food cooking oven, particularly for use in commercial or collective food service applications, includes a cooking cavity and a heat generating device. A fan is provided for fan-assisted cooking and is adapted to transfer heat to the inside of the cooking cavity. A zirconium-oxide cell is located at a wall of the oven and has one of its sides open towards the outside atmosphere and the other one of its sides open towards the inside of the cooking cavity and is capable of measuring the relative concentration of oxygen within the cavity. The terminals of the zirconium-oxide cell are connected to an indicator, which is arranged so as to be visible from the outside of said oven. The cell terminals are also connected to a controller, which preferably includes at least one connected electronic microprocessor unit and is arranged so as to be able to automatically determine the moisture content of the gas mixture inside the cooking cavity.

9 Claims, 5 Drawing Sheets

HUMIDITY MEASUREMENT ARRANGEMENT AND COOKING OVEN PROVIDED THEREWITH

BACKGROUND OF THE INVENTION

The present invention relates to a cooking oven, in particular an oven for cooking food, provided with a moisture measurement arrangement so as to enable the degree of humidity in the cooking cavity to be automatically adjusted to a pre-set level during food cooking processes.

In the following description of the present invention, reference is made in particular to an oven for cooking food in catering or food service establishments. It will, however, be appreciated that what is described and claimed here equally applies to any other type of food cooking ovens.

Food cooking ovens are already known that are substantially formed of a box-like casing defining an inner cooking cavity in which the food to be cooked is properly arranged. A forced-draft hot air circulation is generated in said cooking cavity by means of a gas-fired or electric heat generator and at least one fan. These food cooking ovens are provided with appropriate thermostatic arrangements for automatic adjustment of a selected food cooking temperature. These thermostatic control means are associated with corresponding temperature selection means which are adjusted by the user to the desired temperature setting before each cooking process is started, in accordance with the type and the amount of food to be cooked. The thermostatic temperature control means of these ovens operate in such a manner as to keep the cooking temperature within pre-determined limits inside the cooking cavity of the oven, generally by cyclically switching on and off the heat generator and/or a steam generator if the oven is designed to also cook by steam. The fan is also controlled so as to appropriately vary the flow of hot air circulating through the cooking cavity.

These cooking ovens, however, are not provided with any arrangement for adjusting the humidity of the air inside the cooking cavity. Humidity of the air being in this case a factor that, combined with the temperature, decisively affects both the quality of the cooking process as a whole and the taste of the food being cooked. Since said humidity is variable depending on a number of parameters of the cooking process, such as the cooking temperature, the type and the actual amount of food to be cooked, the replacement rate of the air in the cooking cavity, and so on, these appliances are unable to ensure desirable food cooking results. On the other hand improved cooking would be achieved in a most desirable manner, under the same performance conditions, if such a humidity adjustment function could be carried out in the process.

Humidity control and measurement devices are known in connection with a number of applications of different kinds. They generally include semiconductor-type sensors, which are arranged in humid rooms or compartments to be controlled and are connected with electric bridge-like measurement circuits that are adapted to detect corresponding electric signals generated by said sensors so as to automatically convert the signals into respective levels of humidity in the room being measured.

Other types of moisture measurement arrangements include elements for measuring concentration of oxygen in gaseous mixtures, such as zirconium-oxide cells, operating according to well-known principles.

However, all such humidity measurement devices and arrangements, while ensuring accurate and correct measurement results, are generally poorly suited on applications involving the measurement of humidity in a food cooking environment, where temperatures prevail that may be anywhere between approximately 100° C. and 250° C. according to the type and the amount of food to be cooked. These devices can be damaged, and therefore unable to correctly perform their duty any longer, and their sensing elements are subject to soiling causing alteration of the related measurement values.

SUMMARY OF THE INVENTION

It is therefore a purpose of the present invention to overcome the drawbacks and the limitations of the afore cited humidity measurement devices and arrangements by providing a humidity measurement arrangement in a food cooking oven according to the appended claims and the following description.

BRIEF DESCRIPTION OF THE DRAWINGS

The invention is given by way of non-limiting example with reference to the accompanying drawings, in which.

DETAILED DESCRIPTION OF THE PREFFERED EMBODIMENTS OF THE INVENTION

Figure 1:
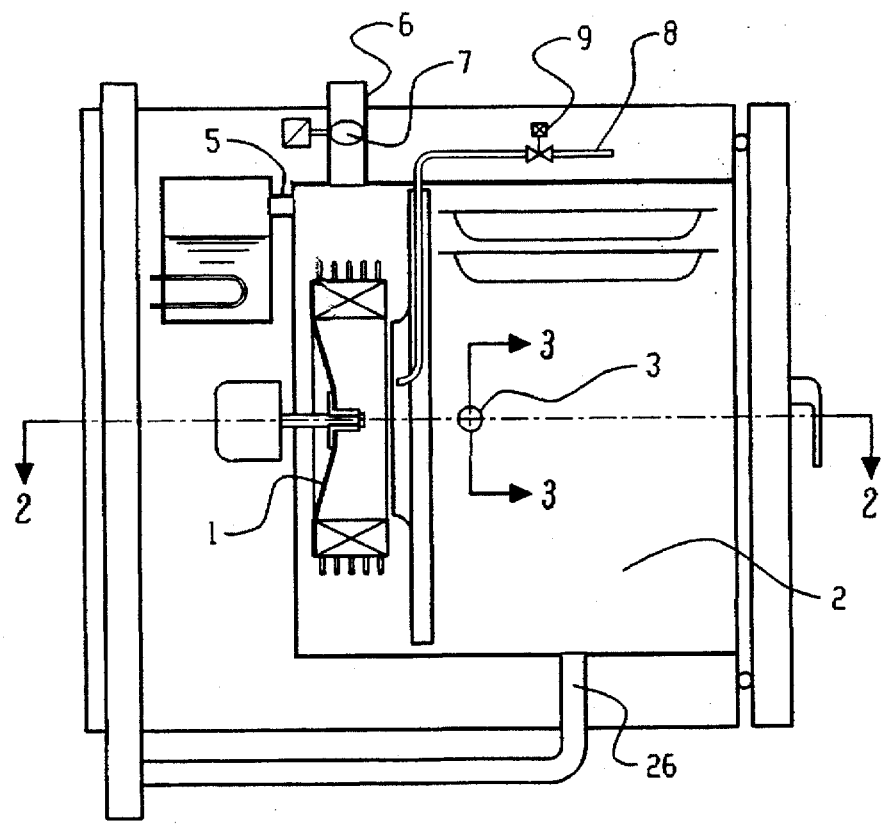
FIG. 1 is an elevational view in cross-section showing schematically a food cooking oven according to the present invention.
Figure 2:
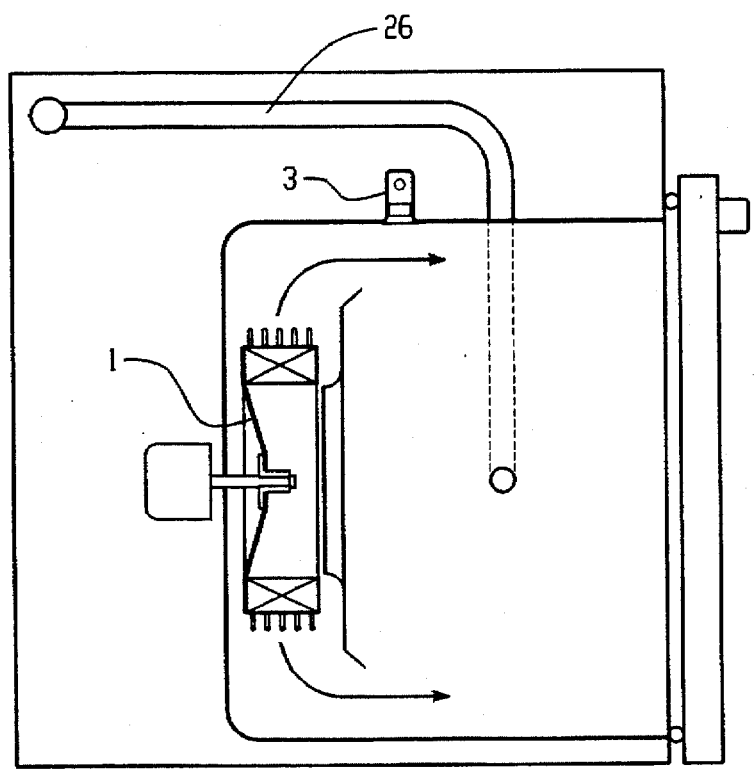
FIG. 2 is a top view of the oven taken in a section from line 2—2 of FIG. 1.

Referring now to FIGS. 1 and 2, an interior of a cooking cavity 2 of a food cooking oven, for example, for professional kitchens, includes a motor-driven fan 1 arranged on a rear side of said cooking cavity 2. Appropriate arrangements (not shown) to generate and propagate microwaves inside said cooking cavity can also be provided, for instance of the type described in the European patent application no. 90119715 filed by the same applicant.

Food contained in said cooking cavity may be processed in a number of different ways, such as for instance by forced-draft circulation of hot air produced by suitable gas-fired or electric heat generating means (not shown) of some known type, by steaming, by a combination of steaming and forced-convection hot air, or by microwaves alone or combined with forced-convection hot air and/or steam.

The oven also comprises a humidity measurement arrangement 3, such as a probe, according to the present invention, which is shown housed in the cooking cavity 2 and is arranged to operate in a way that is described below. Such an arrangement substantially includes probe means adapted to measure partial pressure of oxygen inside the cooking cavity with respect to the external environment. Said probe means are appropriately arranged and insulated to exclude any interference by the other gases present in the cooking cavity. It is well known that, based on such a measurement, the value of the humidity prevailing in the cooking cavity can then be inferred.

The state of the art in this particular field is briefly recalled here. A zirconium-oxide based probe for detecting oxygen concentrations generally includes a cell that features a pair of electrodes (usually of platinum) applied thereto, and which is kept at a constant temperature T (normally 350° C.). "Reference air" with a known and constant oxygen concentration is delivered on one of the two sides of the cell. By measuring with a suitable millivoltmeter the electromotive force of the cell, a direct indication of the concentration of oxygen in contact with the cell, on the "measurement" side thereof, is obtained. The above described method has for instance has found a wide application in the measurement of oxygen concentration in flue gases. On the other hand, it may be also used advantageously for measuring humidity in hightemperature air-steam mixtures.

Figure 5:
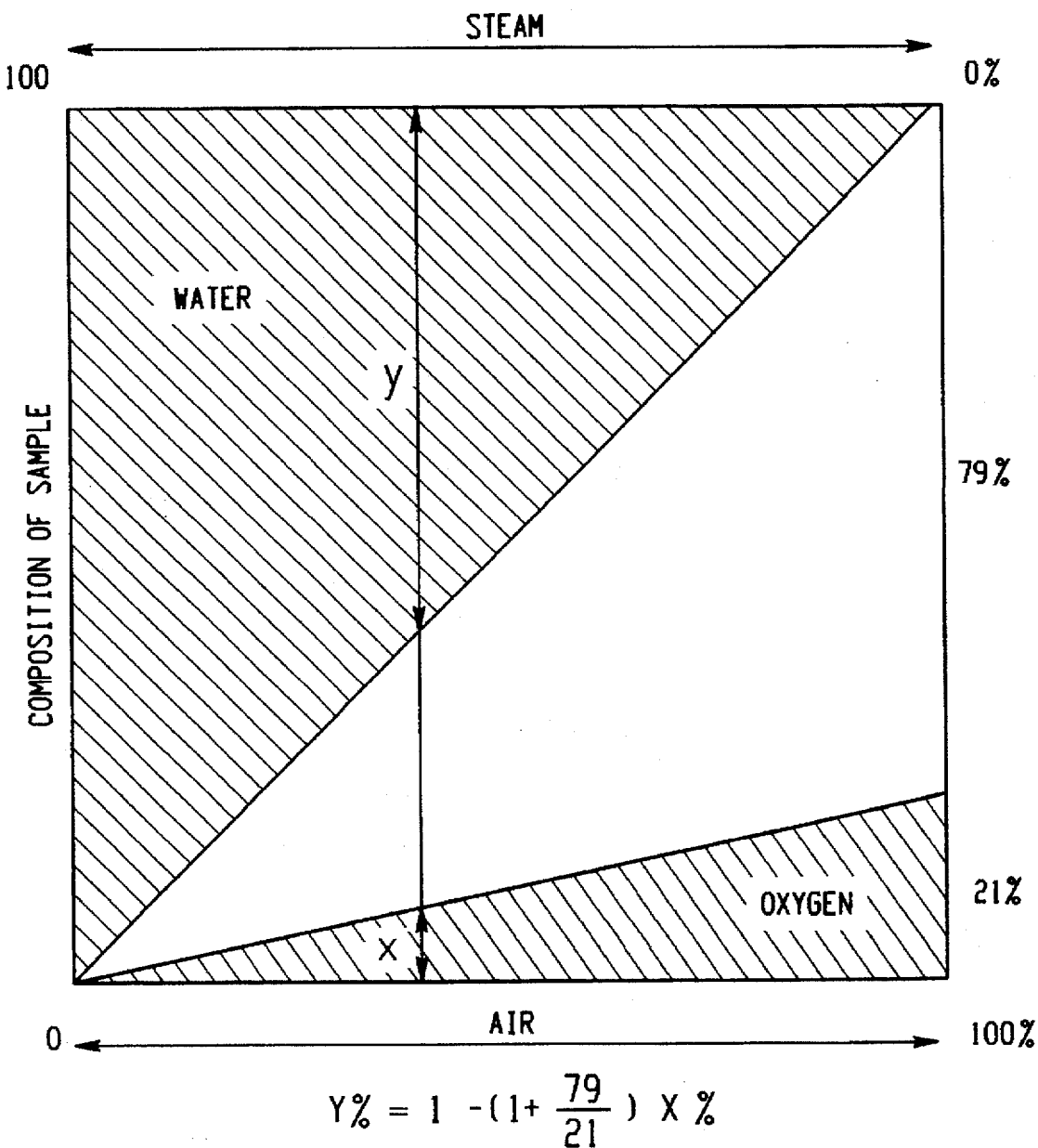
FIG. 5 is a diagram of the composition of a gas mixture, composed by air and water vapor, versus the percentage of air.

Based on the assumption that the oxygen/nitrogen ratio in the air is constant, a measurement of the concentration of oxygen enables the percentage of a third gas, water vapor in this particular case, to be determined directly when the third gas is added to a sample of the air being measured. In fact, the presence of a third gas added to a sample of air has the effect of reducing in a proportional manner the presence of oxygen and nitrogen in the sample, as is shown in FIG. 5. As a result, determining the relative concentration of oxygen in such a sample, or in a particular room which was originally filled only with air, such as the interior of a cooking cavity at the beginning of the cooking process, allows the amount of gases, such as water vapor, introduced in and differing from the original components of the mixture to be determined as well.

Therefore, by using a normal zirconium-oxide probe along with an appropriate converter means it is possible to measure the humidity prevailing in air/steam mixtures at temperatures of up to approximately 600° C. It has been observed that the output signal from the probe is not affected to any significant extent by the variations in the temperature and humidity of the ambient air used as a reference.

Returning to FIGS. 1 and 2, the oven may further be provided with a boiler 4 for steam generation purposes, as well as an appropriate conduit 5 for delivering said steam from the boiler 4 to the cooking cavity 2.

The oven may be additionally provided with a flue riser 6 for exhausting flue gases and excess vapors, as well as a venting shutter 7 for shutting said flue riser for the purpose of adjusting the internal atmosphere in the oven cavity. The oven may be further provided with a conduit 8 for letting in water against blades of the fan 1 so as to produce an atomization effect when the water comes into contact with the heating elements. A corresponding shut-off valve 9 is associated with said conduit 8. Finally, a drain conduit 26 is connected to the bottom of said cooking cavity so as to enable residual liquids, such as fat, water and other cooking by-products, to be conveniently removed therefrom.

The present invention provides a cooking oven with a humidity measurement arrangement as described. The arrangement 3 and the cooking oven are adapted for a mutually compatible operation so as to optimize the performance capabilities of the oven.

Figure 3:
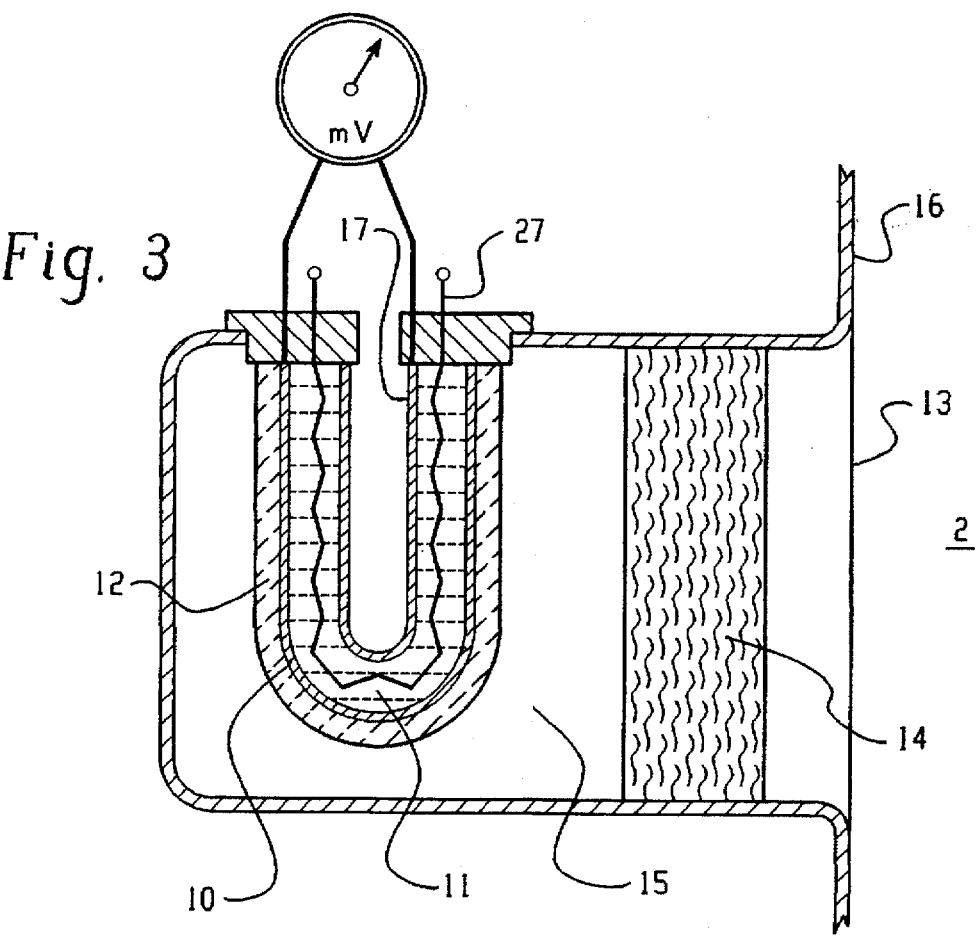
FIG. 3 is a view of a construction detail of a humidity measurement arrangement according to the present invention taken in section from line 3—3 of FIG. 1.

Referring now to FIG. 3, the humidity measurement arrangement 3 includes zirconium oxide (ZrO$_2$) based solid electrolyte 11, a layer of porous ceramics 12 protecting a porous platinum electrode 10 against corrosive agents, and a resistive element 27 to heat the zirconium oxide to a temperature of approximately 350° C. in view of increasing its electric conductivity.

This arrangement is accommodated in a recess 15 provided, preferably by press forming, in a wall 16 of the cooking cavity of the oven. The arrangement also comprises a surface of porous platinum 17 having a sealed tubular form which, like the afore cited electrode 10, acts as a catalytic-effect electrode to amplify the electromotive force that is generated. due to the difference between the partial pressure of the oxygen in the ambient air and the partial pressure in the cooking cavity.

Fat and other soiling particles from cooking ingredients could settle upon the internal electrode of said probe during the use of the oven, thereby sealing up the electrode and, as a result, putting the probe out of service. Thus, a fat filter or protective baffle 14 (such as a labyrinth or metal gauze) with fat and soil retaining properties is removably provided at the entrance 13 of the recess 11 that houses the probe.

Figure 6:
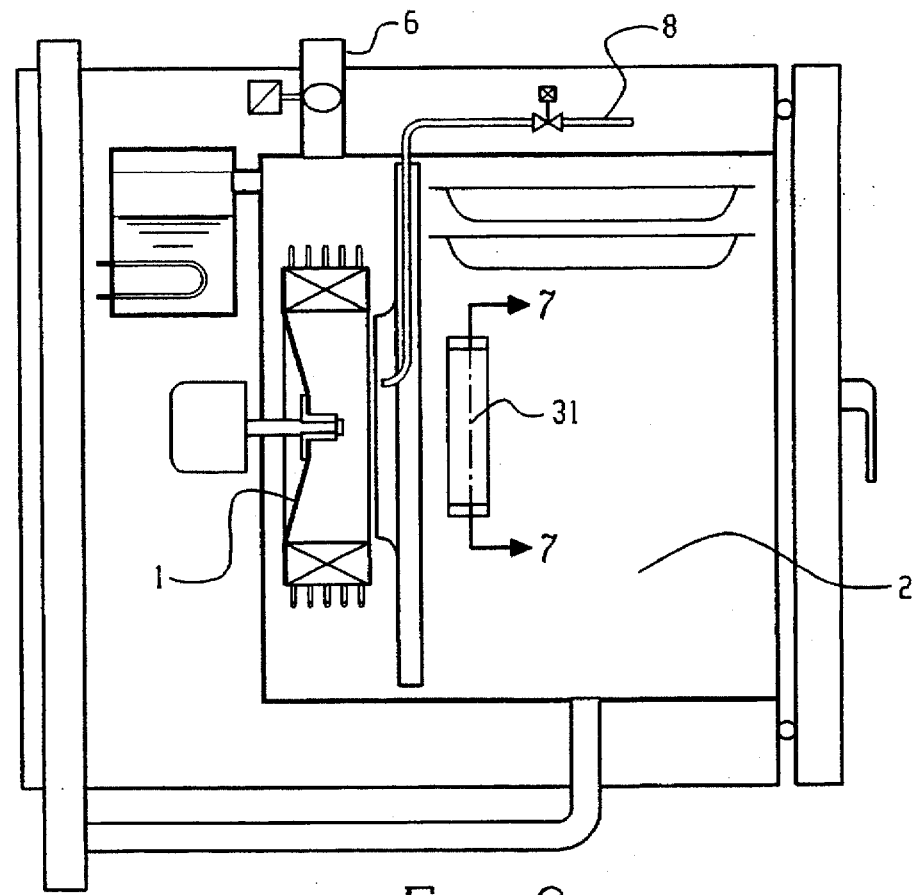
FIG. 6 is an elevational, cross-sectional view of a cooking oven according to an improved embodiment of the present invention.
Figure 8:
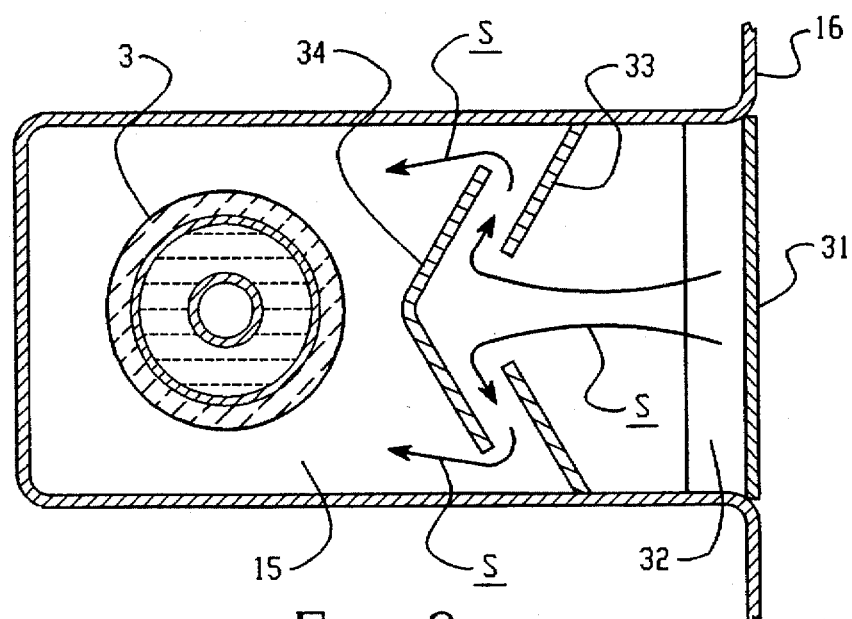
FIG. 8 is an enlarged view of a front section of the cooking oven taken from line 8—8 of FIG. 7.
Figure 7:
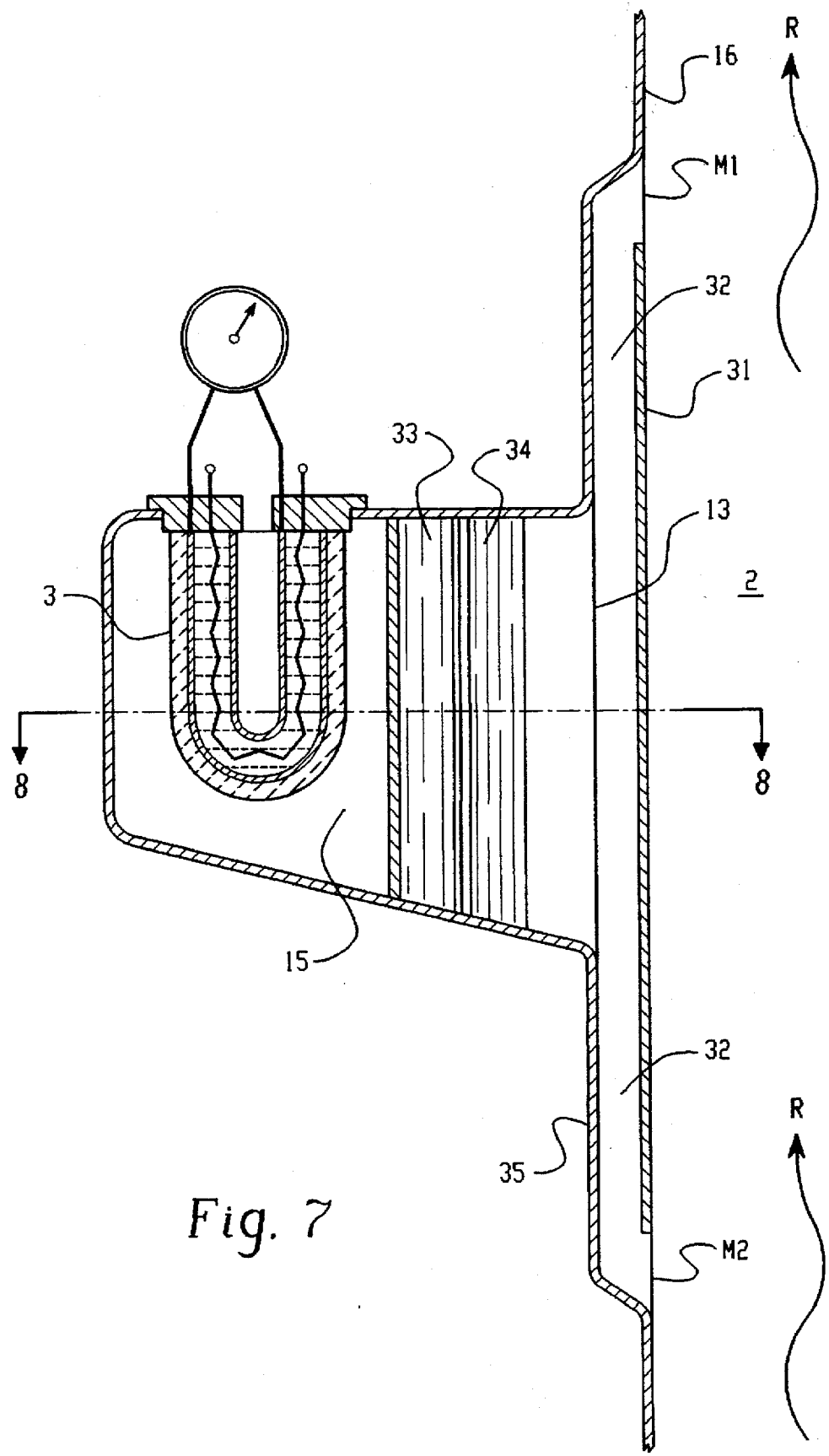
FIG. 7 is an enlarged view of a front section of the improved embodiment taken from line 7—7 of FIG. 6.

In order to be removable, such a protective baffle requires some constructional components for assembly and disassembly. In view of eliminating such practical drawbacks, another embodiment of the present invention is further proposed. This is illustrated in FIGS. 6 to 8 which show that the measurement arrangement 3 is housed in the recess 15 provided in the wall 16 of the cooking cavity 2. However, the recess 15 is provided in a re-entering portion 35 (FIG. 7) of the wall 16. Said re-entering portion is partially covered by a cover 31 so that hollow spaces or double-wall configurations 32 are obtained between said cover 31 and said re-entering portion 35.

Slits M1 and M2 through which said hollow spaces open towards the interior of the cooking cavity are provided to enable steam to diffuse so as to reach the probe 3. The lower slit M2 serves additionally the purpose of ensuring draining of washing or condensation liquids that seep through the other slit M1.

In a most advantageous manner, the cover 31 is arranged in such a way that said slits M1 and M2 are flush with the wall so as to avoid affecting the flow generated by the fan arrangement. Furthermore, the cover is oriented in such a manner that the slits are arranged orthogonally with respect to air flow R which is generally conveying fat and other soil particles that may occlude the probe.

For obvious reasons, particles tend to follow the trajectory of the air flow R without penetrating into the slits, whereas humidity diffuses quickly into the hollow space 32 and, from there, into the interior of the recess 15. Humidity reaches the probe without being assisted by air circulation.

It is possible that, during operation transients or during phases provided to wash the cooking cavity, soiling particles will seep through the hollow space 32 and, from there, enter the recess 15. In order to prevent such particles from being deposited onto the probe, it is advantageous to provide a labyrinth-type filter, which may for instance, include a plurality of walls 33, 34. The walls 33, 34 force the air flow to follow a path extending partly backwards between the entrance 13 of the recess and the probe, so as to stop the flow of particles.

In a preferred manner, such a filter is made, as shown in FIG. 8, so that a preferential air-circulation path S inside the filter is orthogonal with respect to the direction of the air flow coming from the hollow space 32 and making its way into the recess 15, thereby maximizing the stoppage effect.

It will be readily appreciated that a timely and reliable measure in the form of an analog electric signal which is representative of the humidity prevailing in the cooking cavity of the oven can be used to generate indications for display outside the oven and also to automatically control some actuating members. For instance, the signal can be used for switching the boiler 4 on and off, adjusting the venting shutter 7 of the flue riser 6 and controlling the shut-off valve 9 of the water conduit 8, so as to generate and maintain pre-selectable temperature and humidity conditions inside the cooking cavity.

Figure 4:
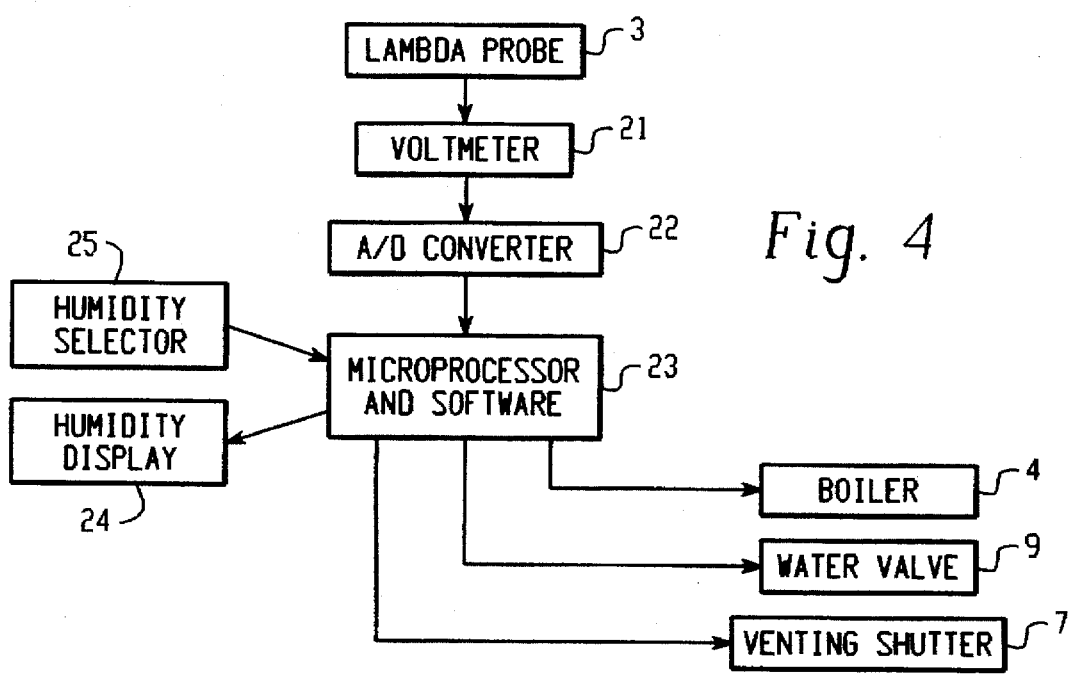
FIG. 4 is a flow-chart of an operation sequence of the oven according to the present invention.

A flow-chart illustrating the operation of the various members is shown in the form of a block diagram in FIG. 4. The measurement arrangement 3, may be defined as a lambda probe in accordance with international conventions designating the lambda excess air factor as the ratio of the value being examined to the stoichiometric value of the combustion air. The probe is connected to a voltage meter 21 supplying an analog/digital voltage converter 22 which in turn sends the converted signal to an appropriately programmed processing and control means 23. The control means is adapted to both supply an appropriately provided display 24 on the outside of the oven with signals indicative of the detected humidity contents in the oven cavity, and receive humidity-degree signals as set through appropriate adjusting means 25.

A particularly advantageous opportunity created by such a function lies in the possibility of said processing and control means 23 automatically adjusting the humidity inside the cooking cavity of the oven to the pre-set value by constantly processing and comparing said pre-set value with the value being detected by the measurement arrangement 3. Then, with any of a number of well-known state-of-art techniques, the processor controls the operation of the boiler 4, the water inlet valve 9 and the venting shutter 7 accordingly, so as to automatically attain and maintain said pre-set value.

The oven is of course provided with a number of further elements and arrangements which, due to their not being an object of the present invention, are omitted. It will be appreciated that, although the present invention has been described in an example of a preferred embodiment thereof and using a generally known terminology, it nevertheless cannot be considered as being limited thereby, since anyone skilled in the art will be able to make a number of variations and modifications pertaining to both the construction and the shape of the arrangement according to the present invention.

What is claimed is:

1. A food cooking oven, comprising a cooking cavity (2), heat generating means, means to transfer heat to an inside of said cookinq cavity, and a probe (3) capable of measuring a relative concentration of oxygen within the cooking cavity disposed within an outwardly protruding recess (15) formed in a wall (16) of the cooking cavity, the recess having an entrance (13) protected by an oxygen-permeable, fat-retaining and removable baffle (14).

2. An oven according to claim 1, characterized in that said probe is a zirconium-oxide cell having a side open towards an outside atmosphere and another side open towards the inside of said cooking cavity.

3. An oven according to claim 2, further comprising indicating means (24) adapted to display degree of humidity prevailing inside said cooking cavity, and processing and control means (23) including an electronic microprocessor and characterized in that said probe is operatively connected to said control means, the control means being adapted to supply information concerning the degree of humidity prevailing inside said cooking cavity for display on said indicating means (24).

4. An oven according to claim 3, further comprising at least one of: a steam generator means (4); a shut-off valve means (9) in a conduit (8) for letting water into said cooking cavity; and an adjustment means (7) for adjusting steam and vapor outlet from the inside to an exterior of said cooking cavity, characterized in that the oven is provided with setting means (25) adapted to select a pre-definable degree of humidity, said setting means (25) being connected to said processing and control means (23).

5. An oven according to claim 4, characterized in that said processing and control means (23) are adapted to automatically determine and maintain inside said cooking cavity the degree of humidity pre-defined by said setting means (25) by acting on at least one of said steam generator means (4), water inlet shut-off valve means (9), and steam and vapor outlet adjustment means (7).

6. A food cooking oven, comprising a cooking cavity (2), heat generating means, means to transfer heat to an inside of said cooking cavity, and a probe (3) capable of measuring a relative concentration of oxygen within the cooking cavity disposed within an outwardly protruding recess (15) formed in a wall (16) of the cooking cavity, the recess (15) being formed in a re-entering portion (35) of the wall of the cooking cavity, said re-entering portion being partly protected by a cover (31) which combines with said re-entering portion to form a double-wall configuration (32) connecting said recess with said cooking cavity (2).

7. An oven according to claim 6, characterized in that said cover (31) is arranged so as to be flush with the respective wall (16).

8. An oven according to claim 6, characterized in that said double-wall configuration (32) defines a slit (M1 or M2) between said cover and said re-entering portion, a longitudinal axis of said slit extending orthogonally to air flow (R) reaching said slit.

9. An oven according to claim 6, characterized in that a labyrinth-type filter (33, 34) is arranged between an entrance (13) of said recess and said probe, said filter being oriented so that a preferential path (S) followed by air through the filter is orthogonal to a direction of air flow in said double-wall configuration (32).

* * * * *